(12) United States Patent
Edwards

(10) Patent No.: US 7,533,799 B2
(45) Date of Patent: May 19, 2009

(54) WEIGHT SCALE FAULT DETECTION

(75) Inventor: Thomas V. Edwards, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 152 days.

(21) Appl. No.: 11/639,075

(22) Filed: Dec. 14, 2006

(65) Prior Publication Data

US 2008/0141755 A1    Jun. 19, 2008

(51) Int. Cl.
*G06F 17/00* (2006.01)
*G01G 19/52* (2006.01)

(52) U.S. Cl. .................. 235/375; 177/25.11; 177/50; 73/1.13

(58) Field of Classification Search ............ 235/61, 235/85, 375–379, 383, 385; 73/1.13; 702/87, 702/101, 102, 129, 173, 179, 194, 199; 705/23, 705/407, 414, 415; 177/25.11–50
See application file for complete search history.

(56) References Cited

U.S. PATENT DOCUMENTS

| 4,715,457 | A | | 12/1987 | Amacher et al. | |
|---|---|---|---|---|---|
| 4,787,467 | A | * | 11/1988 | Johnson | 235/385 |
| 5,883,968 | A | * | 3/1999 | Welch et al. | 382/100 |
| 6,594,668 | B1 | * | 7/2003 | Hudy | 707/101 |
| 6,794,586 | B1 | | 9/2004 | Mason | |
| 2003/0024982 | A1 | * | 2/2003 | Bellis et al. | 235/383 |
| 2005/0173527 | A1 | * | 8/2005 | Conzola | 235/385 |
| 2008/0005036 | A1 | * | 1/2008 | Morris | 705/64 |

* cited by examiner

*Primary Examiner*—Seung H Lee
*Assistant Examiner*—Christle I Marshall
(74) *Attorney, Agent, or Firm*—Maginot, Moore & Beck LLP; Paul W. Martin

(57) ABSTRACT

A self-service checkout terminal includes a scanner and a weight scale. The customer passes each item past the scanner to identify the item and obtain weight data for that item from a centralized database, including a mean weight and a standard deviation. An error value is calculated from the measured weight of each item and the weight data. The error value of all items scanned during the common transaction are summed to produce an accumulated error for the particular weight scale during that transaction. This accumulated error is compared to a threshold value to determine whether a fault condition exists at the weight scale.

9 Claims, 6 Drawing Sheets

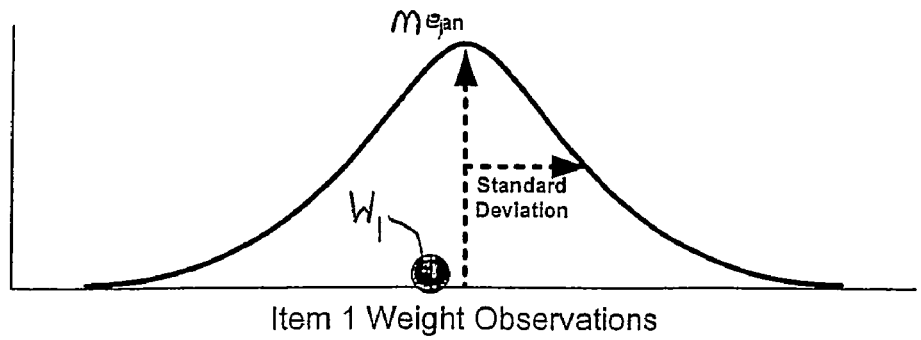
Figure 3a. Item 1 Weight Distribution and New Weight Sample
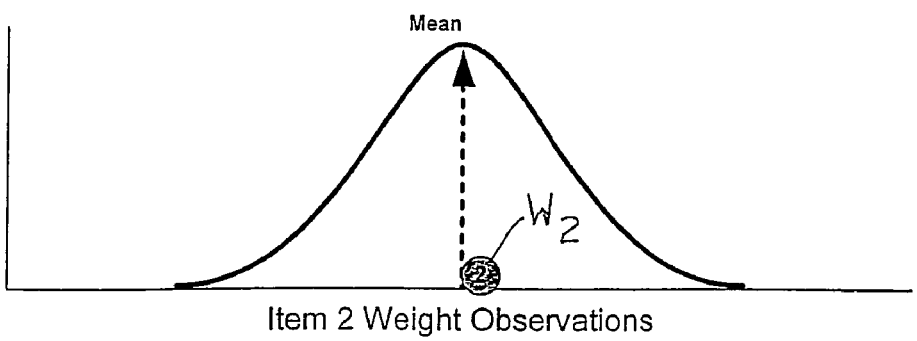
Figure 3b. Item 2 Weight Distribution and New Weight Sample
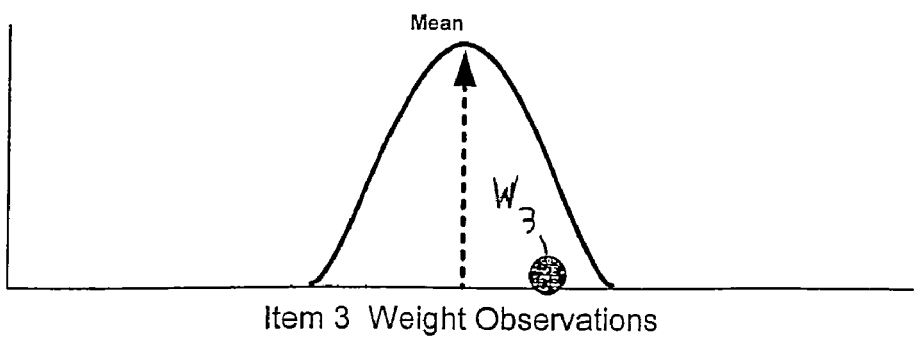
Figure 3c. Item 3 Weight Distribution and New Weight Sample
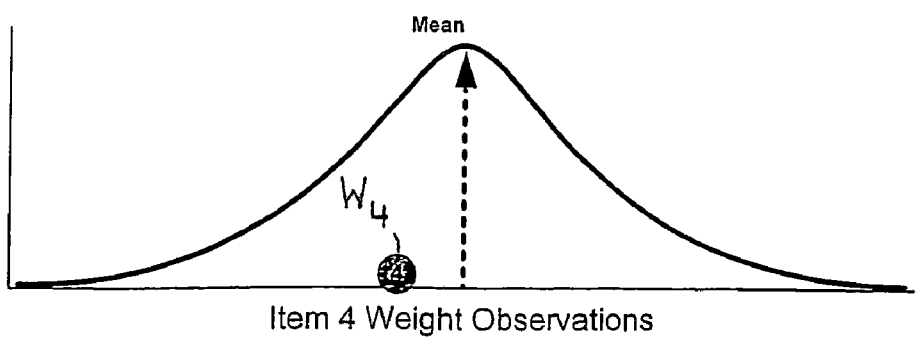
Figure 3d. Item 4 Weight Distribution and New Weight Sample

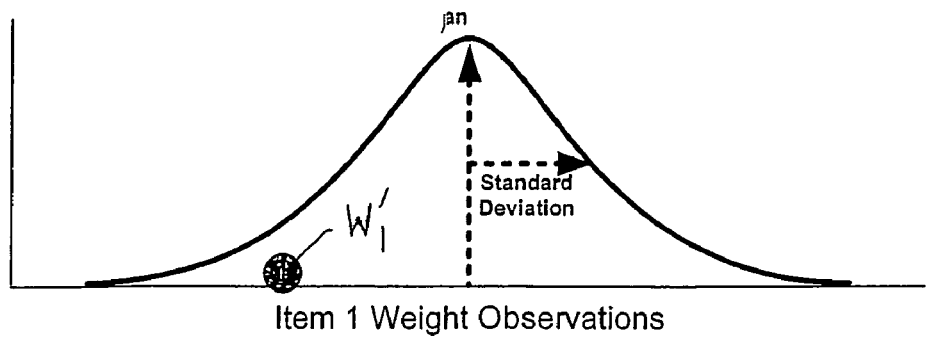
Figure 4a. Item 1 Weight Distribution and Shifted Weight Sample
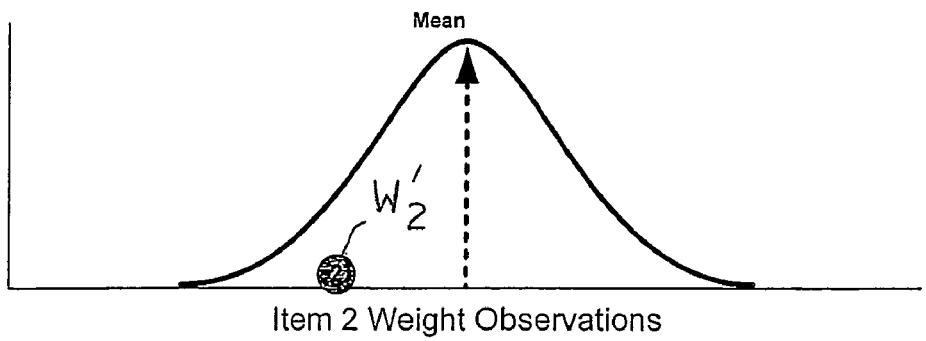
Figure 4b. Item 2 Weight Distribution and Shifted Weight Sample
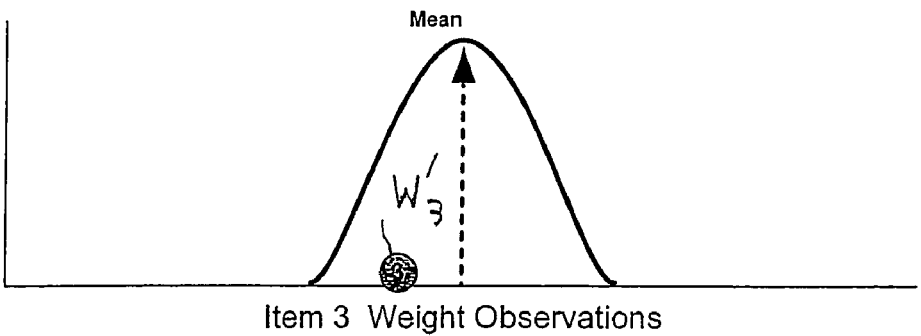
Figure 4c. Item 3 Weight Distribution and Shifted Weight Sample
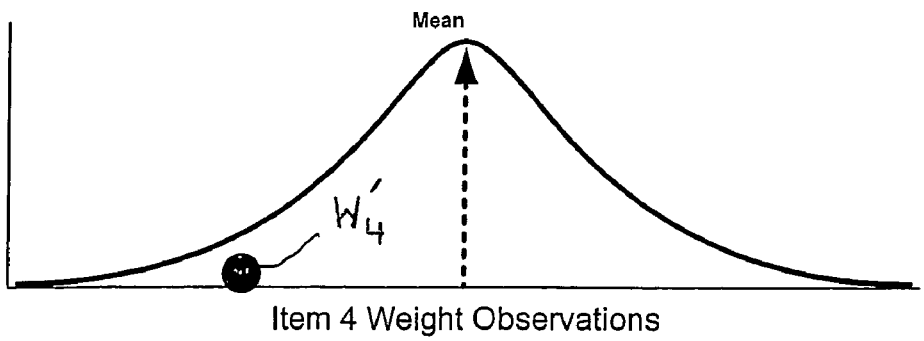
Figure 4d. Item 4 Weight Distribution and Shifted Weight Sample

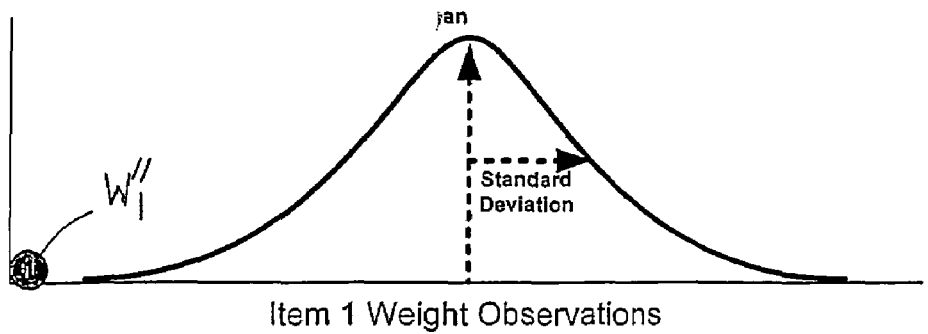
Figure 5a. Item 1 Weight Distribution and Bad Weight Sample
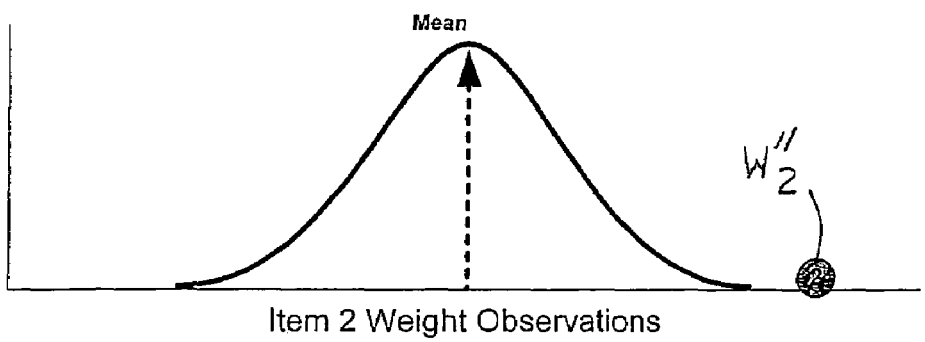
Figure 5b. Item 2 Weight Distribution and Bad Weight Sample
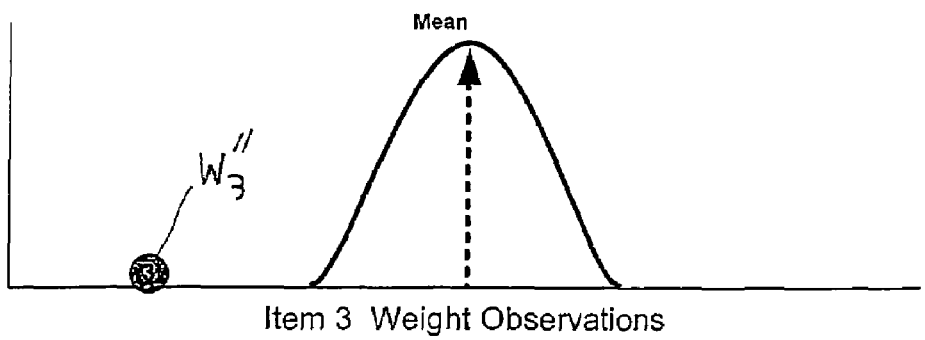
Figure 5c. Item 3 Weight Distribution and Bad Weight Sample
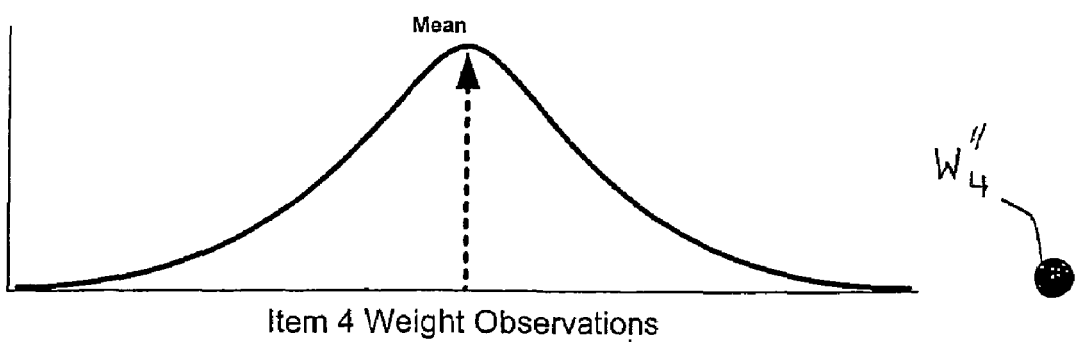
Figure 5d. Item 4 Weight Distribution and Bad Weight Sample

| h | $M_h$ | $SD_h$ | \multicolumn{2}{c}{$3\sigma$ BAND} | $W_n$ | $E_h$ | $\Sigma E_h$ | $E_{AVE}$ |
|---|---|---|---|---|---|---|---|---|
| \multicolumn{9}{l}{Test case samples on mean} |
| 1 | 1 | 0.1 | 0.7 | 1.3 | 1 | 0 | | |
| 2 | 5 | 0.2 | 4.4 | 5.6 | 5 | 0 | | |
| 3 | 1.5 | 0.02 | 1.44 | 1.56 | 1.5 | 0 | | |
| 4 | 0.5 | 0.05 | 0.35 | 0.65 | 0.5 | 0 | | |
| | | | | | | | 0 | 0 |
| \multicolumn{9}{l}{Typical data for good scales} |
| 1 | 1 | 0.1 | 0.7 | 1.3 | 1.1 | 1 | | |
| 2 | 5 | 0.2 | 4.4 | 5.6 | 4.7 | -1.5 | | |
| 3 | 1.5 | 0.02 | 1.44 | 1.56 | 1.53 | 1.5 | | |
| 4 | 0.5 | 0.05 | 0.35 | 0.65 | 0.42 | -1.6 | | |
| | | | | | | | -0.6 | .14 |
| \multicolumn{9}{l}{Shift error of 1 sd.} |
| 1 | 1 | 0.1 | 0.7 | 1.3 | 1 | 0 | | |
| 2 | 5 | 0.2 | 4.4 | 5.6 | 4.5 | -2.5 | | |
| 3 | 1.5 | 0.02 | 1.44 | 1.56 | 1.51 | 0.5 | | |
| 4 | 0.5 | 0.05 | 0.35 | 0.65 | 0.37 | -2.6 | | |
| | | | | | | | -4.6 | .14 |
| \multicolumn{9}{l}{Shift Error of -0.1 lb.} |
| 1 | 1 | 0.1 | 0.7 | 1.3 | 1.2 | 2 | | |
| 2 | 5 | 0.2 | 4.4 | 5.6 | 4.8 | -1 | | |
| 3 | 1.5 | 0.02 | 1.44 | 1.56 | 1.63 | 6.5 | | |
| 4 | 0.5 | 0.05 | 0.35 | 0.65 | 0.52 | 0.4 | | |
| | | | | | | | 7.9 | 2.475 |
| \multicolumn{9}{l}{Random Errors} |
| 1 | 1 | 0.1 | 0.7 | 1.3 | 1.4 | 4 | | |
| 2 | 5 | 0.2 | 4.4 | 5.6 | 3 | -10 | | |
| 3 | 1.5 | 0.02 | 1.44 | 1.56 | 1.25 | -12.5 | | |
| 4 | 0.5 | 0.05 | 0.35 | 0.65 | 1.5 | 20 | | |
| | | | | | | | 1.5 | 11.625 |

FIG. 6

WEIGHT SCALE FAULT DETECTION

BACKGROUND

The present invention relates generally to a retail checkout terminal, and especially to self-service terminals. More particularly, the invention concerns systems and methods for improving the security of self-service checkout processes and to personalize the security features based on customer metrics.

In the retail grocery or supermarket industry, the impetus to reduce labor costs has focused on reducing or eliminating the amount of time required to handle and/or process the products purchased by the customer. To this end, a number of self-service checkout terminals have been developed which substantially eliminate the need for a checkout clerk. In particular, the typical self-service checkout terminal is operated by the customer without the aid of a checkout clerk. In such a system, the customer scans individual items for purchase across a scanner and then places the scanned items into a grocery bag. The customer then pays for the purchases either at the self-service terminal itself or at a central payment area staffed by a store cashier.

The customer typically has little or no training in the operation of a self-service checkout terminal prior to his/her initial use of the terminal. Customer inexperience and sometimes more nefarious intentions in the use of the self-service checkout require the integration of some form of security into the checkout terminal. Such security prevents a customer from either inadvertently or deliberately placing an item into a grocery bag without first scanning the item to enter the price of the item onto the final bill.

Thus, the typical self-service terminal includes security systems that monitor the operation of the terminal and the activities of the customer. For example, weight scales are incorporated into the terminal to monitor the total weight of the items brought by the customer to the terminal and the total weight of the items placed in a grocery bag. In such security systems, a software routine is executed by a computer or processor associated with the terminal that analyzes the signal output from the weight scale, as well as other user-interfaces of the terminal. The typical software routine compares the weight of each item as it is scanned with a database of expected weight values. Any discrepancy results in the generation of an error message and a pause in the checkout routine until the customer takes appropriate corrective action, such as re-scanning the merchandise.

One known self-checkout terminal 10 used in a supermarket setting is depicted in FIG. 1. The terminal 10 includes a product weight scale 12 used to sell items by weight and a scanner 14 associated with the scale. A bagging scale 20 is provided adjacent the scanner to support grocery bags 40 into which the customer places each newly scanned item. The terminal 10 includes a cart scale sized to support a fully loaded shopping cart 21 and a basket scale 19 configured to support a shopping basket 23 full of products. Each of the scales 12, 18, 19 and 20 include at least one weight detector, such as a pressure sensor or a load cell sensor, which is operable to generate a signal in response to the weight of the item(s) placed on the scale. A kiosk 24 includes a display 32, data input device 34 and a payment device 30. A computer or processor 26 is resident within the terminal and executes various software routines associated with the self-checkout process.

One of those routines accepts weight signals from the scales 18, 19 and 20. In one type of weight verification routine, the mean weight $M_n$ of each product or item 1 through n available in the supermarket is stored in a database along with a weight standard deviation $SD_n$ for each item. As an item is scanned by the scanner 14 and placed on a scale 18, 19 or 20, the weight measured at the scale 18, 19 or 20 is compared to a weight range calculated from the mean and standard deviation data extracted from the database for that item. If the weight falls within a calculated range $M_n \pm$ the standard deviation $SD_n$ (optionally multiplied by an arbitrary constant A), the entry is accepted. If the weight falls outside this range the entry is rejected and the customer is instructed to re-scan and/or re-weigh the item. In addition, in some terminals, a weight error is communicated to a store attendant as part of the terminal security measures. The routine continuously updates the mean weight and standard deviation values for each item with each new accepted observation of the weight of that item.

Since the scales form a critical link in the self-checkout process, the uncompromised operation of the scales is critical. Unfortunately, the weight scale is a common point of error or failure for the checkout terminal due to the high likelihood of spillage or the collection of debris in the working elements of the scales that ultimately interferes with the normal scale operation. For example, a very common failure occurs when a foreign object becomes lodged between the top plate of the scale and the adjacent cabinetry. When the object prevents movement of the scale, the failure is easily detected but the scale is rendered unusable. However, in the worst case, the foreign object simply increases the drag on the scale movement, typically producing a low weight error. When this type of failures occurs, the ability to verify the weight of a purchased item is compromised, subjecting the customer and store attendant to increased numbers of security messages and interventions. This intervention is especially troubling to the honest and experienced customer who is attempting to use the self-checkout terminal properly.

These failure modes are difficult to detect, often requiring complete failure before the detrimental condition is recognized. In a typical case, the weight scale behavior deteriorates over time, gradually impacting the system to ever-increasing degrees until a complete failure threshold has been reached. One approach to finding a potential scale failure is to run a calibration test on the product weight scale at each self-checkout terminal in the store. Of course, this approach is very cumbersome, time consuming and manpower intensive.

Thus, there is a need for a system and method that can automatically test a self-service checkout product weight scale continuously throughout the day while allowing the terminal to remain in service and without requiring human intervention or involvement in the test. The system and method should be capable of operating generally transparently to the customer, meaning that there is no appreciable effect on the amount of time necessary for a customer to complete a sales transaction at the terminal.

SUMMARY OF THE INVENTION

In order to address these needs, the present invention contemplates a system and method for determining a fault condition in a weight scale that can be readily integrated into an existing checkout terminal system. The method comprises the steps of obtaining weight data for a plurality of items being weighed at the weight scale during a common transaction. The items are individually weighed at the weight scale to obtain a weight value for the current item. This weight value is compared to the weight data obtained for the particular item and an error is calculated as a function thereof.

In accordance with one feature of the invention, an accumulated error is calculated as a function of the error for each of the weight measurements for each of the items. In one particular embodiment, the accumulated error is the summation of all of the individual weight measurement errors. A fault condition of the weight scale is indicated if the accumulated error exceeds a threshold. In certain embodiments, a first threshold may be provided as an indication that a fault condition may be arising. A second threshold may then be provided indicative of a total failure of the weight scale.

In the preferred embodiment of the invention, the weight data includes the mean weight $M_n$ and standard deviation $SD_n$ for each of the plurality of items 1–n. This weight data is maintained in a centralized database and is based on a history of item weights obtained from every checkout terminal in the system. In accordance with the present invention, if no error condition is determined, the weight values for each of the items processed in the current transaction are added to the centralized database and used to calculate a new mean weight and standard deviation.

In accordance with one feature of the invention, error $E_n$ for each item is a function of the mean weight and standard deviation for that item. Thus, the following equation may be applied to calculate that error: $E_n = (W_n - M_n)/SD_n$, where $W_n$ is the measured weight for item n. The accumulated error is thus the arithmetic sum of all of the errors $E_n$ for the items processed during the common transaction. Alternatively, or in addition, the average of the absolute value or magnitude of each of the errors $E_n$ may be calculated. The accumulated error and average error may then be compared to corresponding thresholds. If either calculated error value exceeds its respective threshold, a fault condition is determined to exist for the particular weight scale.

As a further aspect of the invention, the steps for determining a fault condition are integrated into the processor of each checkout terminal. Thus, the processor in each terminal includes a first routine operable to obtain weight data for each of the plurality of items scanned at the terminal during the transaction, a second routine operable to calculate an error for the measured weight of each item relative to the weight data for that item, and a third routine operable to determine an accumulated error as a function of the error for each of the weighed items. The processor further includes a fault indicator operable to indicate a fault condition of the weight scale if the accumulated error exceeds a threshold.

Preferably, each checkout terminal forms part of a network in communication with a central processor where the centralized weight database is maintained. Each terminal communicates the weight data obtained during each transaction to the central processor to be integrated into the weight database. Each terminal may also communicate the status of its weight scale to the central processor, especially if a fault condition has been detected. Alternately, the fault detection routine may be located in the central processor.

It is one object of the present invention to provide a system and method for evaluating the status of a weight scale for a checkout terminal. More particularly, one object is to evaluate this status interactively but transparently with each transaction at the terminal.

Thus, one benefit of the present invention is that it provides a system for evaluating the health of the weight scale continuously during the operation of the checkout terminal without the intervention of customers or store employees. Another benefit is that the system is software based so that it does not interfere with the normal operation of the terminal and does not require a distinct test operation. Other objects and benefits of the invention will be appreciated upon consideration of the following written description and accompanying figures.

DESCRIPTION OF THE FIGURES

FIGS. 3a-3d are weight distribution curves for a normally functioning weight scale.

FIGS. 4a-4d are weight distribution curves for a weight scale that measures consistently lower weight for scanned items.

FIGS. 5a-5d are weight distribution curves for a weight scale experiencing random weight errors.

FIG. 6 is a series of tables with weight and error data for a variety of normal scale operation and scale weighing error conditions.

DESCRIPTION OF THE PREFERRED EMBODIMENTS

Figure 1:
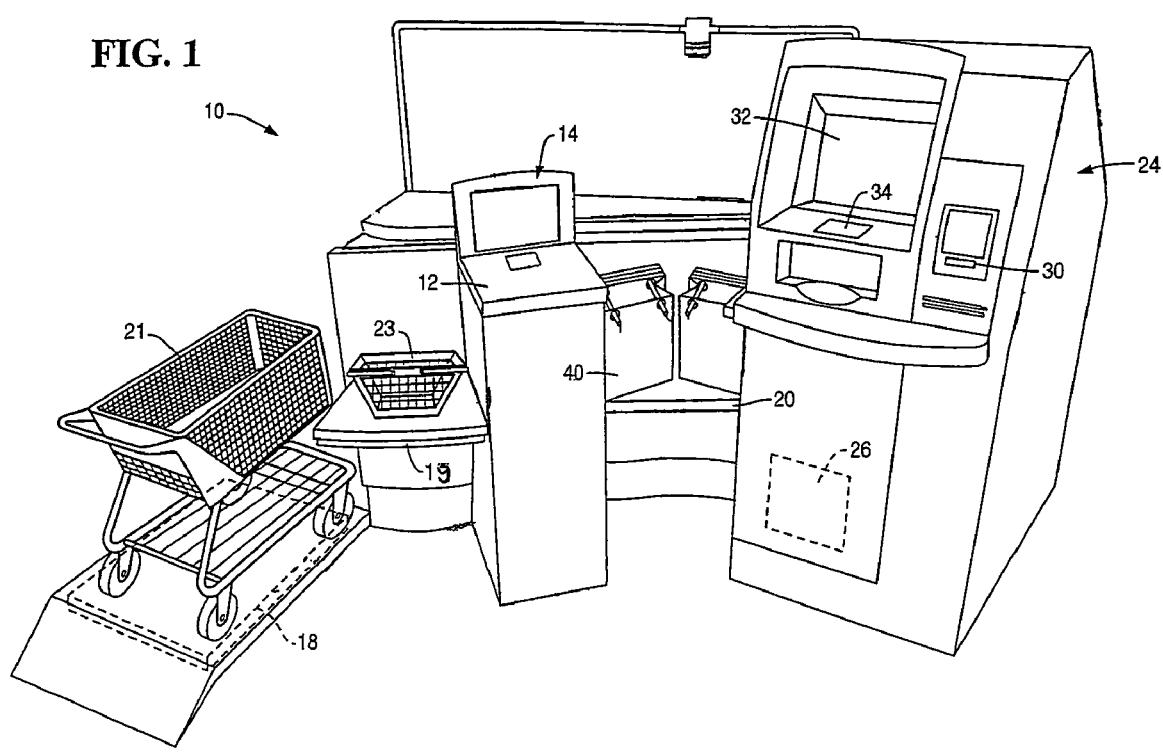
FIG. 1 is a perspective view of one type of self-service checkout terminal adaptable to incorporate the systems and methods of the present invention.

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 2:
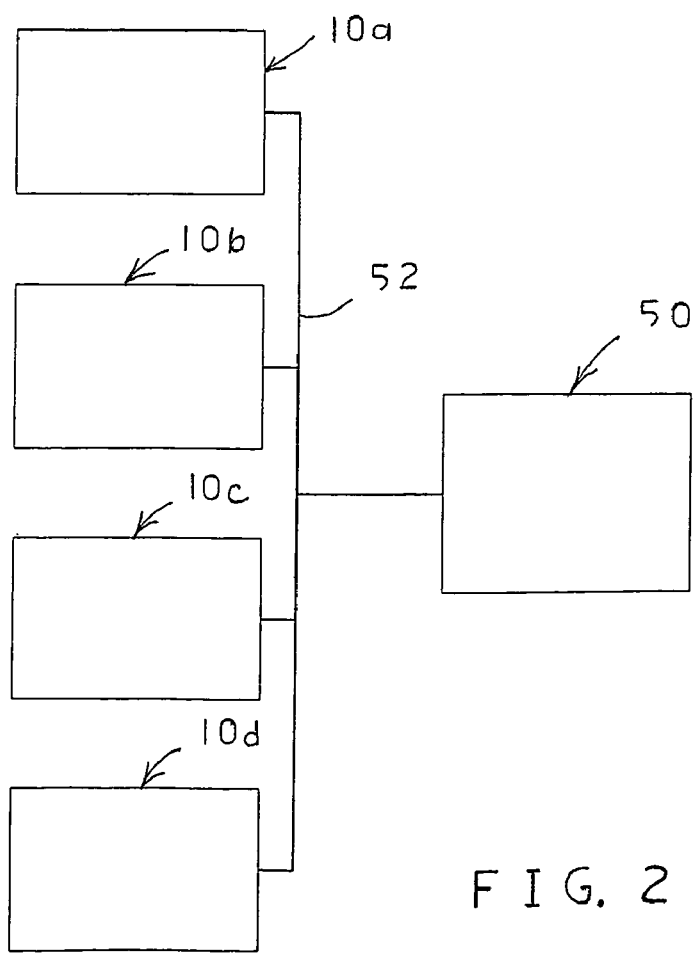
FIG. 2 is a block diagram of a multiple terminal system that communicates with a central processor and centralized database.

The present invention provides a system and method for interactively testing all self-service checkout terminals at a retail facility. In one embodiment, the facility includes terminals 10a-10d, as shown in FIG. 2, all linked via data lines 52 to a central processor or computer 50. The central computer 50 maintains a centralized weight database that is accessed by each of the checkout terminals 10a-10d. Thus, in lieu of storing the weight database in the processor 26 associated with each terminal, each terminal is provided with access to a centralized database, while the weight verification routines may remain resident at each terminal. The central computer 50 preferably updates the mean weight $M_n$ and standard deviation $SD_n$ data based on the item weights measured at each of the terminals 10a-10d.

In accordance with one aspect of the invention, the centralized weight and weight variance data is used to detect a measurement bias in any given checkout terminal 10a-10d. The invention provides means to detect exceptional behavior in one terminal relative to the history of weights and deviations among all of the terminals in the system. Moreover, since the centralized weight database is based on data points accumulated from several weight scales over a long period of time, the weight and variance data is more accurate, which means that short term failures in multiple product weight scales may be detected with ease.

The principles of the present invention may be demonstrated with reference to the weight distribution graphs in FIGS. 3a-3d and 4a-4d. The graphs in FIGS. 3a-3d show a hypothetical weight distribution for four items, each represented by the typical bell distribution curve centered about the mean weight value $M_n$. Of course, the standard deviation $SD_n$ is a measure of the variation from that mean and is used to establish an acceptable range of weights for the subject item. It is known that about two-thirds of the new weight samples $W_n$ will fall within the 1σ deviation about the mean. It is also known that the distribution curve will "tighten up" as more sample weights are added to the weight database.

In the examples, the weight observations $W_n$ for each item measured by the particular scale falls within the envelope of the weight distribution curve. Some of the weight observations, such as weights $W_1$ and $W_2$ shown in FIGS. 3a and 3b, are clustered closely around the mean weight $M_n$, while the other two observations $W_3$ and $W_4$ shown in FIGS. 3c and 3d, deviate more widely but still fall within the distribution curve.

However, a weight measurement that falls within the distribution curve or acceptable standard deviation range about the mean does not tell the entire story about a particular weight scale. For a correctly behaving or accurate scale, the average weight for a particular item measured on that scale will approach the mean weight $M_n$. In accordance with one embodiment of the invention, an error function is defined that provides an ongoing measure of the behavior or accuracy of each scale in a retail system. For this embodiment, the error function is:

$$E_n = (W_n - M_n)/SD_n, \text{ where}$$

$E_n$ is the error for the particular scale weighing each item n,
$M_n$ is the mean weight of item n,
$W_n$ is the new weight measurement by the particular scale for item n, and
$SD_n$ is the standard deviation among all of the weight measurements for item n.

For each transaction, the particular scale will generate an accumulated error $\Sigma E_n$ corresponding to the error value for all the items weighed at that scale. For any properly functioning scale weighing numerous distinct items this accumulated error $\Sigma E_n$ will converge toward zero over time because each weight observation will gradually approach the overall mean weight $W_n$ for each item n. However, if the particular scale is malfunctioning, the accumulated error $\Sigma E_n$ will diverge or increase over time.

By way of example, the graphs of FIGS. 4a-4d represent weight samples obtained by the same scale used to generate the weight samples plotted in FIGS. 3a-3d. However, as can be seen from the graphs, the later weight samples are significantly offset to the lower weight side of the weight distribution curves. The accumulated error $\Sigma E_n'$ for the transaction depicted in FIGS. 4a-4d will be noticeably greater than the accumulated error in the transaction depicted in FIGS. 3a-3d. Not only is the magnitude of the accumulated error $\Sigma E_n'$ greater in the later transaction, the direction of the measurement shift is toward the lower weight for each item sampled. In contrast, the weight measurements for the transaction in FIGS. 3a-3d are scattered on either side of the weight mean $M_n$—weight measurements $W_1$ and $W_4$ are lower than their respective means, while weights $W_2$ and $W_3$ are greater than the mean. On the other hand, all of the weight measurements $W_1'$-$W_4'$ are shifted toward the low weight region of the distribution curve.

It can be appreciated that the weight samples in the second transaction depicted in FIGS. 4a-4d can be interpreted in two ways to reveal a failure in the particular weight scale. First, the accumulated error has increased from the earlier transaction (FIGS. 3a-d) to the later transaction (FIGS. 4a-d). Second, all of the weight samples $W_1'$-$W_4'$ are skewed to one side of the mean weight in this case suggesting that a foreign object is preventing the weight scale from being depressed under the weight of the items being weighed.

In the examples in FIGS. 3a-3d and 4a-4d, the weight samples all fall within the weight distribution curves for the respective items. The failure occurring in the second sample (FIGS. 4a-4d) can be readily diagnosed because the accumulated error $\Sigma E_n'$ is greater than the earlier accumulated error $\Sigma E_n$. However, the weight samples $W_1''$-$W_4''$ plotted in FIGS. 5a-5d represent a failure that may not be easily detected using the accumulated error alone. The weight errors depicted in FIGS. 5a-5d are outside the weight distribution curve, or more particularly outside the 3σ band about the mean weight $M_n$, so it is apparent that there is something dramatically wrong with the particular weight scale. However, the accumulated error $\Sigma E_n''$ for this transaction is very small because the wide swing in weight samples are substantially offset on either side of the mean. In other words, the extremely low weight $W_1''$ in FIG. 5a (producing a large negative error value $E_1''$) is substantially offset by the extremely high weight $W_4''$ in FIG. 5d (producing an equally large positive error value $E_4''$). The same offset can be found by comparing the positive error $E_2''$ in FIG. 5b with the comparable negative error $E_3''$ in FIG. 5c. The resulting accumulated error $\Sigma E_n''$ is in the range of the accumulated error for the first transaction of FIGS. 3a-3d.

Thus, simply evaluating the progression of the accumulated error between transactions may not be sufficient to diagnose a weight scale failure. In this case, the severity of the problem with the scale is evident from an average of the absolute values of the weight measurement errors. In the transaction shown in FIGS. 5a-5d, the weight errors $E_1''$-$E_4''$ will not offset each other, but instead combine to generate an extremely large and very noticeable average error $E''_{ave}$.

The table of FIG. 6 illustrates the various weight measurement conditions that may arise in a multiple self-checkout terminal system. The tables contemplate the same four products or items being measured in each of the five scenarios. However, it is understood that the typical implementation of the present invention may involve from one to a few dozen items to be weighed. It is also understood that the error detection features of the present invention do not depend upon the same items being scanned over successive transactions on a given terminal or being scanned among the various terminals 10a-10d (FIG. 2) of the system.

Returning to the example in FIG. 6, the first table of data corresponds to an initial calibration measurement that is conducted for each product/item being sold. It is contemplated that a sufficient random number of each item is weighed to generate a statistically significant mean weight $M_n$ and standard deviation $SD_n$. The standard deviation value is used to establish a bandwidth about the mean corresponding to an acceptable product weight when scanned at the checkout terminals. In the illustrated embodiment, the three sigma band is applied to encompass 97% of the weights within the weight distribution curve. The standard deviation values $SD_n$ and three sigma band for each item are applied to every product weighing transaction.

As shown in the first table, the standard deviation values are not dependent upon the actual weight of the item. In other words, the three sigma range for the two lightest items 1 and 4 correspond to about 60% of the mean weight. The three sigma ranges for the heavier items 2 and 3 are 24% and 8% respectively. In terms of the weight distribution curve, the lighter items 1 and 4 will have flatter or broader distribution curves, corresponding to the curves depicted in FIGS. 3a and 3d. The other two items will have narrower distribution curves, on the order of the curves shown in FIGS. 3b and 3c. These standard deviation and three sigma values reflect the realities in measuring consumer products—some products will have a more consistent weight, such as products sold be weight rather than by volume. On the other hand, some products will normally have greater variability to their accepted weight, such as a bunch of bananas. In the latter case, the wider three sigma band means that greater variability in actual scale measurement will be tolerated for that particular item.

The second table in FIG. 6 represents typical data for a properly functioning product weight scale. Although each error value $E_n$ is greater than 1.0, the accumulated error $\Sigma E_n$ is less than 1.0 because the errors falls on both sides of the respective item mean weights $M_n$. The average error value $E_{ave}$ is also minimal since the magnitude of each "over-weight" and "under-weight" error value is not large.

The third and fourth tables illustrate the effects of relatively small measurement errors across multiple items. In the third table, the shift corresponds to a one standard deviation error shift, while the fourth table illustrates the effects of a –0.1 lb. error in cumulative weight measurement. In the third case, the average error was identical to the average error for the normally functioning scale in the second table. However, the accumulated error $\Sigma E_n'$ is significantly greater. Similarly, in the fourth example, even a modest cumulative weight error of –0.1 lbs. produces an accumulated error $\Sigma E_n''$ that is even greater still. These increases in accumulated error can signal an error or fault condition in the particular scale.

The final example in FIG. 6 corresponds to random errors in the measured weight of the four products. In this case, the accumulated error $\Sigma E_n'''$ is less than for the prior two examples, and not significantly larger than the accumulated error for a properly functioning scale. However, the average error $E_{ave}'''$ is dramatically larger than any other average error. This fault condition corresponds to the wide positive and negative swing in weight measurement depicted in FIGS. 5a-5d.

Figure 7:
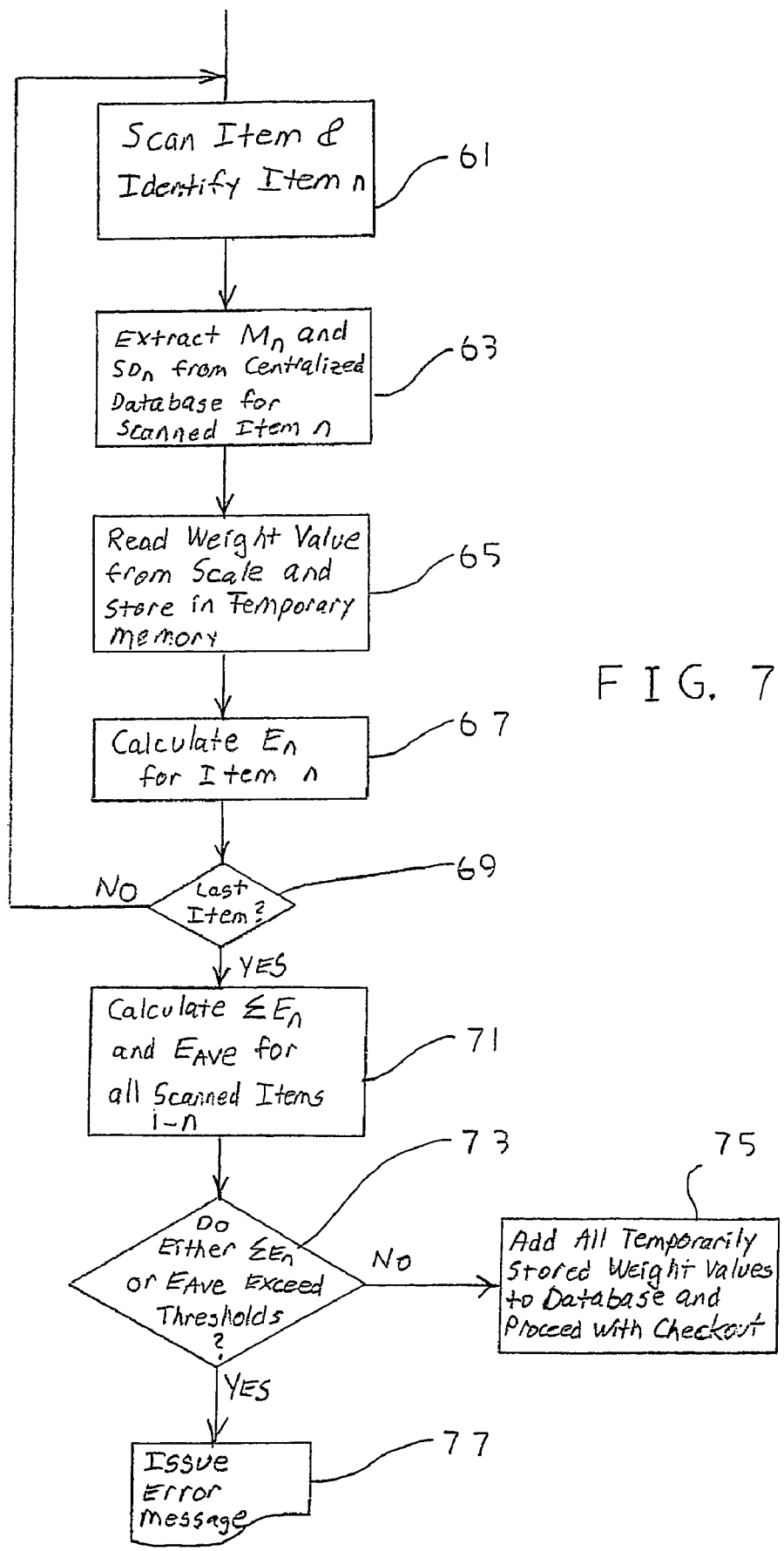
FIG. 7 is a flowchart of the steps according to one method of the present invention for evaluating weight data to assess a scale error or fault condition.

The present invention contemplates that each scale is continually monitored as it is being used. Software routines within the processor 26 (FIG. 1) of the terminal 24 can implement the steps diagrammed in the flowchart of FIG. 7. When a customer places an item on the scanner 14, the first step 61 is to scan and identify the item. In step 63, that scanned information is used to extract the weight data from the centralized database 50 (FIG. 2), including the mean weight $M_n$ and standard deviation $SD_n$ for that item. Next, the scale 18, 19 or 20 is read to obtain a weight value $W_n$ for the item in step 65. That measured weight value is held in temporary memory until the status of the scale has been verified. It can be recalled that in some self-service checkout facilities, the centralized weight database is constantly updated by the measured weights of product actually purchased using the checkout terminal. However, until it can be verified that the weight value $W_n$ for the current item is legitimate, the value cannot be added to the database.

The processor 26 of the terminal 24 calculates the error $E_n$ for the scanned item n in step 67 and then determines in step 69 whether the last item has been scanned by the customer. In a typical self-service checkout terminal, a prompt appears on the display 32 and the customer makes an entry on the device 34 when the customer is ready to complete the checkout process. In the absence of such an indication, the processor 26 returns to step 61 and repeats steps 61-67 for each newly scanned item 1–n.

Once the last item has been scanned, the processor calculates, in step 71, the accumulated error $\Sigma E_n$ and the average error $E_{ave}$ among all the items 1–n that have been scanned and weighed at the terminal 10. In the next step 73, a determination is made as to whether either of the calculated values $\Sigma E_n$ or $E_{ave}$ exceeds a predetermined threshold. The appropriate threshold values are preferably maintained in the central processor 50 to ensure uniform performance among all of the terminals 10a-10d and their associated weight scales 18, 19 and 20. The threshold values can be assigned to suit the needs for the particular facility and/or as a function of the standard deviation data for each item. In the examples shown in the charts of FIG. 6, a threshold value for the accumulated error $\Sigma E_n$ may be ±2.0, while a threshold value for the average error $E_{ave}$ may be 3.0. With these thresholds, each of the last three samples of FIG. 6 would produce an error condition. Higher threshold values mean that only significant faults in the weight scales will generate an error condition. Conversely, lower threshold values will trigger error conditions at the first hint of trouble.

Alternatively, multiple threshold values may be provided for each error parameter $\Sigma E_n$ and $E_{ave}$. A first threshold may be used to generate a warning that the particular scale may need to be inspected at the first available opportunity. A second threshold may be used to generate an immediate error condition that would render the current transaction void. In either case, if a threshold for either of the error parameters $E_n$ and $E_{ave}$ is exceeded, the processor 26 and/or the central processor 50 can issue an error message at step 77. This error message may be simply logged at the central processor 50 and/or may be transmitted to an on-site clerk. In the event that no error threshold has been exceeded, the processor transmits the temporarily stored weight values $W_n$ to the centralized database in step 75 and the checkout process is allowed to continue.

As indicated above, the threshold values are preferably item specific and maintained in the centralized database. The thresholds may be a function of the standard deviation $SD_n$ for each item so that items having a smaller deviation (and therefore narrower three sigma weight range) will ideally have a lower threshold. While the weight standard deviation values take into account variations in product weight, the threshold values take into account variations in performance of the weight scales. It is of course appreciated that no weight scale will measure the true weight of each item every time. Thus, the threshold values build in a certain acceptable error factor that is superimposed onto the range of acceptable weights for each item incorporated into the standard deviation value for that item. Simply assigning a weight error value independent of the standard deviation does not account for improvements or changes in the normal expected weight range for products. In accordance with the present invention, the calculation of the error values $E_n$ automatically takes into account any changes in the weight standard deviation without operator intervention.

It is understood that these steps are implemented with each use of each checkout terminal and associated weight scale. Since the method steps are implemented in software within the processor 26 of the terminal 24, there should be no appreciable delay in the operation of the weight scale. The data communication between each checkout terminal 10a-10d and the central processor 50 may be accomplished in any fashion, such through a local network. Optionally, the central processor may be off-site and the data lines 55 may be in the form of wireless communication. The centralized database may thus be maintained not only for weight data input by the terminals 10a-10d in one store, the database may also accept weight data from several stores. With this approach, the standard deviation $SD_n$ for each item n should be decrease over time since more data samples can be obtained. It is also contemplated that the centralized database may be populated with mean weight and standard deviation data from the producer of the associated product.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, in accordance with the illustrated embodiment, the accumulated error is the mathematical sum of each weight error for each item. Alternatively, certain weight errors may be weighted or even ignored in generating the accumulated error. For instance, certain products may be very light so that the available weight scale may not be able to respond accurately to that light weight, thereby yielding a large weight error value. This particular weight error may be ignored when generating the accumulated error. In addition, a weight error for one item may fall well outside the range of errors experienced when weighing all other items during the transaction. This error may ignored as an aberration due to customer error, for instance. Thus, the step 71 in the method steps of FIG. 7 may be changed to calculate a modified accumulated error $\Sigma E_n$ and average error $E_{ave}$.

As a further alternative, the threshold values may themselves be calculated with each checkout transaction. In the illustrated embodiment, the error thresholds used to determine the existence of a fault condition may be maintained in the centralized database and accessed by each terminal. In this alternative, the threshold values may be calculated as a function of the standard deviation and/or mean weight of all of the items weighed in the transaction, or even all the items maintained in the centralized database.

What is claimed is:

1. A method for determining a fault condition in a weight scale comprising:

obtaining weight data including a mean weight $M_n$ and a standard deviation $SD_n$ for each item n of a plurality of items 1 through N being weighed at the weight scale during a common transaction;

individually measuring a weight $W_n$ of each of the items n at the weight scale during the transaction;

calculating an error $E_n$ for each the weights $W_n$ relative to the weight data according to the following equation:

$E_n=(W_n-M_n)/SD_n;$ determining an accumulated error as a function of the error $E_n$ for each of the weights $W_n$, including summing all of the errors $E_n$ for all of the items n during the common transaction and calculating an average value $E_{ave}$ for the absolute value or magnitude of each of the errors $E_n$ for all of the items n during the common transaction; and indicating a fault condition of the weight scale if the accumulated error exceeds a threshold including comparing the accumulated error to a first threshold and the average value $E_{ave}$ to a second threshold.

2. The method of claim 1, wherein the step of indicating a fault condition occurs if one or both of the accumulated error and average value $E_{ave}$ exceed their respective threshold.

3. The method of claim 1, wherein the step of obtaining weight data includes extracting the weight data for each of the items n from a centralized database of weight data.

4. The method of claim 3, wherein the step of obtaining weight data includes first scanning the each of the items n to identify the items n and then extracting the weight data according to that identification.

5. In a checkout terminal having a scanner for identifying an item to be processed at the terminal and a weight scale for measuring the weight of the item, a system for determining a fault condition of the weight scale comprising:

a processor at the terminal operable to obtain a weight value $W_n$ for each item n of a plurality of items 1 through N scanned at the terminal during a common transaction;

a first routine within the processor operable to obtain weight data including a mean weight $M_n$ and a standard deviation $SD_n$ for each of the items n scanned at the terminal during the transaction;

a second routine within the processor operable to calculate an error $E_n$ for each of the weights $W_n$ relative to the weight data according to the following equation:

$E_n=(W_n-M_n)/SD_n;$ a third routine within the processor operable to determine an accumulated error as a function of the errors $E_n$ for each of the items n, including summing all of the errors $E_n$ for all of the items n during the common transaction and calculating an average value average value $E_{ave}$ for the absolute value or magnitude of each of the errors $E_n$ for all of the items n during the common transaction;

a fourth routine operable to compare the accumulated error to a first threshold and the average value $E_{ave}$ to a second threshold; and a fault indicator operable to indicate a fault condition of the weight scale if the accumulated error exceeds a threshold.

6. The system for determining a fault condition of the weight scale of claim 5, wherein said first routine communicates with a centralized database of item weights to obtain the weight data.

7. The system for determining a fault condition of the weight scale of claim 5, wherein said fourth routine is operable to indicate a fault condition if one or both of the accumulated error and average value $E_{ave}$ exceed their respective threshold.

8. A method for determining a fault condition in a weight scale comprising:

obtaining weight data including a mean weight $M_n$ and a standard deviation $SD_n$ for each item n of a plurality of items 1 through N being weighed at the weight scale during a common transaction;

individually measuring a weight $W_n$ of each of the items n at the weight scale during the transaction;

calculating an error $E_n$ for each of the weights $W_n$ relative to the weight data according to the following equation:

$E_n=(W_n-M_n)/SD_n;$ determining an accumulated error as a function of the error $E_n$ for each of the weights $W_n$, including calculating an average value $E_{ave}$ for the absolute value or magnitude of each of the errors $E_n$ for all the items n during the common transaction; and indicating a fault condition of the weight scale if the accumulated error exceeds a threshold.

9. A method for determining a fault condition in a weight scale comprising:

obtaining weight data for a plurality of items being weighed at the weight scale during a common transaction;

individually measuring the weight of the plurality of items at the weight scale during the transaction;

calculating an error for each of the weight measurements for the plurality of items relative to the weight data for those items;

determining an accumulated error as a function of the error for each of the weight measurements; and indicating a fault condition of the weight scale if the accumulated error exceeds a threshold, including indicating a potential fault if the accumulated error exceeds a first threshold and indicating a failure of the weight scale if the accumulated error exceeds a second threshold.

* * * * *